(12) United States Patent
Myers (10) Patent No.: US 9,218,544 B2
(45) Date of Patent: Dec. 22, 2015

(54) INTELLIGENT MATCHER BASED ON SITUATIONAL OR SPATIAL ORIENTATION

(71) Applicant: Apple Inc., Cupertino, CA (US)

(72) Inventor: Scott A. Myers, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 103 days.

(21) Appl. No.: 13/757,581

(22) Filed: Feb. 1, 2013

(65) Prior Publication Data

US 2014/0219520 A1  Aug. 7, 2014

(51) Int. Cl.
*G06K 9/00* (2006.01)
*G06K 9/62* (2006.01)

(52) U.S. Cl.
CPC .......... *G06K 9/6255* (2013.01); *G06K 9/00087* (2013.01)

(58) Field of Classification Search
USPC ................ 382/115, 116, 124; 340/5.52, 5.53, 340/5.82, 5.83
See application file for complete search history.

(56) References Cited

U.S. PATENT DOCUMENTS

| | | |
|---|---|---|
| 5,844,961 A | 12/1998 | McEvoy et al. |
| 5,872,834 A | 2/1999 | Teitelbaum |
| 5,995,630 A | 11/1999 | Borza |
| 6,041,410 A | 3/2000 | Hsu et al. |
| 6,181,807 B1 | 1/2001 | Setlak et al. |
| 6,323,846 B1 | 11/2001 | Westerman et al. |
| 6,518,560 B1 | 2/2003 | Yeh et al. |
| 6,556,935 B2 | 4/2003 | Kyuragi et al. |
| 6,570,557 B1 | 5/2003 | Westerman et al. |
| 6,628,810 B1 | 9/2003 | Harkin |
| 6,677,932 B1 | 1/2004 | Westerman |
| 6,719,200 B1 | 4/2004 | Wiebe |
| 6,766,040 B1 | 7/2004 | Catalano et al. |
| 6,888,536 B2 | 5/2005 | Westerman et al. |
| 6,914,517 B2 | 7/2005 | Kinsella |
| 6,930,707 B2 | 8/2005 | Bates et al. |
| 6,973,565 B2 | 12/2005 | Couillard |
| 7,039,224 B2 | 5/2006 | Harel et al. |
| 7,043,061 B2 | 5/2006 | Hamid et al. |
| 7,203,347 B2 | 4/2007 | Hamid et al. |
| 7,212,658 B2 | 5/2007 | Du et al. |
| 7,274,807 B2 * | 9/2007 | Hillhouse et al. ............. 382/124 |
| 7,327,859 B1 * | 2/2008 | Chau ............................. 382/116 |
| 7,356,169 B2 | 4/2008 | Hamid et al. |
| 7,385,381 B1 | 6/2008 | Mainguet |

(Continued)

OTHER PUBLICATIONS

U.S. Appl. No. 13/831,578, filed Mar. 15, 2013, Marciniak et al.

(Continued)

*Primary Examiner* — Wesley Tucker (74) *Attorney, Agent, or Firm* — Brownstein Hyatt Farber Schreck, LLP (57) ABSTRACT

Predicting likely fingerprint information (most likely finger, orientation, or otherwise), responsive to situational information or spatial orientation, for matching with a function button. The device determines first, second, and further likely choices. Responsive to display orientation and an accelerometer, the device determines whether the function button is on the right or left. Responsive to recent movement, the device determines the user's most likely hand movements. Responsive to a lifetime average, situational information, or accessories coupled to the device, the device determines the user's most likely finger choice. Responsive to most likely choice, the device can de-crypt match information while collecting fingerprints.

25 Claims, 5 Drawing Sheets

(56) References Cited

U.S. PATENT DOCUMENTS

| | | | |
|---|---|---|---|
| 7,400,749 B2 | 7/2008 | Hillhouse | |
| 7,474,773 B2 * | 1/2009 | Chau | 382/124 |
| 7,599,530 B2 | 10/2009 | Boshra | |
| 7,616,786 B2 | 11/2009 | Setlak | |
| 7,616,787 B2 | 11/2009 | Boshra | |
| 7,688,314 B2 | 3/2010 | Abdallah et al. | |
| 7,770,019 B2 * | 8/2010 | Ferren et al. | 713/186 |
| 7,894,685 B2 | 2/2011 | Zhai et al. | |
| 7,953,258 B2 | 5/2011 | Dean et al. | |
| 7,970,185 B2 | 6/2011 | Kim et al. | |
| 7,990,269 B2 * | 8/2011 | Bork et al. | 340/556 |
| 8,073,204 B2 | 12/2011 | Kramer et al. | |
| 8,131,026 B2 | 3/2012 | Benkley et al. | |
| 8,150,108 B2 | 4/2012 | Miller | |
| 8,190,907 B2 | 5/2012 | Tu | |
| 8,411,913 B2 * | 4/2013 | Zhang et al. | 382/125 |
| 8,520,913 B2 | 8/2013 | Dean et al. | |
| 8,570,293 B2 | 10/2013 | Deng | |
| 8,577,091 B2 | 11/2013 | Ivanov et al. | |
| 8,625,861 B2 | 1/2014 | Aggarwal et al. | |
| 8,698,594 B2 | 4/2014 | Erhart et al. | |
| 2003/0129965 A1 | 7/2003 | Siegel | |
| 2003/0172027 A1 | 9/2003 | Scott | |
| 2006/0104483 A1 | 5/2006 | Harel et al. | |
| 2006/0188132 A1 | 8/2006 | Shigeta et al. | |
| 2007/0081698 A1 | 4/2007 | Hamid et al. | |
| 2008/0317306 A1 | 12/2008 | Hamilton | |
| 2009/0083850 A1 | 3/2009 | Fadell et al. | |
| 2011/0084711 A1 | 4/2011 | Chang et al. | |
| 2011/0223888 A1 | 9/2011 | Esaki | |
| 2012/0075452 A1 | 3/2012 | Ferren | |
| 2013/0051630 A1 * | 2/2013 | Marques et al. | 382/117 |
| 2013/0101186 A1 | 4/2013 | Walch et al. | |
| 2013/0294660 A1 | 11/2013 | Heilpern | |
| 2014/0003680 A1 | 1/2014 | Marciniak et al. | |
| 2014/0003682 A1 | 1/2014 | Vieta et al. | |
| 2014/0015774 A1 | 1/2014 | Bussat et al. | |
| 2015/0071507 A1 | 3/2015 | Setlak | |

OTHER PUBLICATIONS

U.S. Appl. No. 13/842,052, filed Mar. 15, 2013, Vieta et al.
U.S. Appl. No. 13/802,609, filed Mar. 13, 2013, Bussat et al.
U.S. Appl. No. 14/022,044, filed Sep. 9, 2013, Setlak.
Represent [online]. Dictionary.com 2015 [retrieved Jan. 30, 2015]. Retrieved from the Internet: <URL: http://dictionary.reference.com/browse/represent?s=t>,p. 1.

* cited by examiner

ND SPATIAL ORIENTATION

INTELLIGENT MATCHER BASED ON SITUATIONAL OR SPATIAL ORIENTATION

TECHNICAL FIELD

This application generally relates to an intelligent matcher based on situational or spatial orientation, and other matters.

BACKGROUND

It sometimes occurs that, in devices that attempt to match fingerprints or similar data structures, even after collecting fingerprint or similar information, there might be a relatively large number of possible data structures with which to match that information. For example, in matching fingerprint information, there might be a relatively large number of fingerprints, fingers, or finger orientations, with which to match that information.

It also sometimes occurs that, in devices that attempt to match fingerprints or similar data structures, even after collecting fingerprint or similar information, there might be a relatively large number of possible offsets or orientations with which to match that information. For example, in matching fingerprint information, each finger might have more than one possible orientation at which it can be matched. This can have a first result that there might be a relatively large number of fingerprint orientations with which to match that information. The can also have a second result that there might be a substantial cost to rotate a set of fingerprint information that has been recorded in a first orientation, into a second orientation to compare with retrieved fingerprint information.

It also sometimes occurs that, in devices that attempt to match fingerprints or similar data structures, even after collecting fingerprint or similar information, there might be a relatively large cost to retrieving stored information when attempting to match stored information with retrieved fingerprint information. For example, in devices that maintain fingerprint or similar information in an encrypted form, there could be substantial cost involved, such as time requirements to computed the decrypted information, such as power requirements to perform the computation, or otherwise.

Each of these examples, as well as other possible considerations, can cause one or more difficulties as a result of excessive cost (such as time or processing power required) to match fingerprints when it is desired to do so. For example, It might be desirable to perform fingerprint matching, or matching of other information such as other biometric information, as rapidly as possible, so as to provide greater ease of use.

SUMMARY OF THE DISCLOSURE

This application provides techniques, including devices and structures, and including method steps, that can predict a particular finger, a particular orientation of a finger, or both, likely to be used with a function button (such as a "home" button) when attempting to authorize a user using fingerprint recognition.

In one embodiment, a processor can determine situational information with respect to the device, and can predict a most likely finger, a most likely finger orientation, or both, with respect to a fingerprint to be used with a function button. The function button can be a "home" button positioned as part of the device, or a "soft" button positioned using hardware or software elements on the face of the device. In response to this information, the processor can determine which one or more sets of fingerprint information maintained on the device can be most effectively used first with respect to matching the user's fingerprint.

For one example, a processor can determine an orientation of the device, such as whether the device is performing in a portrait mode or a landscape mode. The processor can determine, in a landscape mode, whether the function button is positioned to the left of the device or to the right of the device (such as in response to an accelerometer or other inertial response sensor), and can conclude whether the user is more likely to use a left-hand finger or a right-hand finger to touch the function button. In response to this information, the processor can determine a most likely finger to be used with the function button. In response to this information, the processor can determine a most likely fingerprint or fingerprint orientation, or both, to be used with respect to matching the user's fingerprint.

For one example, the processor can determine a recent movement of the device (such as in response to an accelerometer or other inertial response sensor), and can conclude which of several known hand or finger movements by the user are most likely. In such examples, if the device is rotated so that the function button is moved to the left, the processor can conclude that the user is most likely to touch the function button with a left-hand finger, as it is more unwieldy to reach across the screen to touch the function button with a right-hand finger. Similarly, in such examples, if the user is more likely to touch the function button with a right-hand finger on the right-hand side of the device, the processor can conclude that the user is most likely to touch the function button with a right-hand finger, as it is more unwieldy to reach across the screen to touch the function button with a left-hand finger.

For one example, the processor can determine an amount of time during which the device has been immobile or inactive (such as when the device has been lying on a flat surface, or when the device has been turned off or otherwise in an inactive mode), and can conclude which of several known hand or finger movements by the user are most likely. In such examples, if the device is inactive for several night-time hours, it might occur that the user has been asleep for that time duration, in which case the processor can conclude that the user will touch the function button to turn the device on. If the user has a habit of using the same finger to turn the device on after a sleep cycle, the processor can conclude that the same finger is most likely to be used in that situation.

For one example, the processor can determine a lifetime average of which finger, or finger orientation, or both, is used by the user to touch the function button with respect to one or more indicated situations. In such examples, indicated situations can be identified by the processor with respect to input from the accelerometer (or other inertial response sensor), with respect to a GPS or Wi-Fi monitor (or other position sensor), with respect to input from a clock or timer (or other time sensor), or otherwise to indicate a particular time, place, or manner in which the device is being used. In such examples, when the processor can determine a relatively high likelihood for which finger, or finger orientation, or both, with respect to the particular situation indicated by the accelerometer, GPS, or other devices.

In a first such case, the processor can determine that, should the same finger, or finger orientation, or both, be used 90% of the time or more in the same situation, then that same finger, or finger orientation, or both, is relatively most likely to be used again. In a second such case, the processor can request information from the user with respect to whether the particular situation should be regarded as "special", in the sense that the particular situation should be used to determine finger, or finger orientation, or both. In a third such case, the processor can use a machine learning technique to determine whether the particular situation should be regarded as "special", in the same or a similar sense.

In a second such case, the processor can determine, if the time of day is the same or similar for a particular situation, the processor can determine that the user is most likely to use the same finger, finger orientation, or both, with respect to the device. For a first example, if the device has been relatively immobile and powered-off (or in standby mode) for several hours overnight, the processor can conclude that the user has placed the device on a night-table or similar location, and that the user is most likely to use the same finger as usual to activate the device upon wake-up. For a second example, if the device has been relatively immobile for more than several minutes, but during the day, the processor can conclude that the user has placed the device on a table for later use, and that the user is most likely to use the same finger as usual to activate the device when needed. For a third example, if the device has been relatively immobile, but at a location other than the user's home or office, the processor can conclude that the user has mistakenly left the device in an unusual location, and can conclude that the user might use a different finger than usual to activate the device when finally located. For a fourth example, if the device cannot authenticate the user using a first set of likely fingerprint information, the processor can conclude that the user is most likely to use an orientation 90° away from that first set of likely fingerprint information.

In one embodiment, when the processor has determined one or more likely fingers, finger orientations, or both, to be used to match with retrieved fingerprint information, the processor can select and retrieve information with respect to those likely fingers, finger orientations, or both, before selecting and retrieving information with respect to less likely fingers or finger orientations. This can have the effect that the processor can determine relatively more rapidly whether the retrieved fingerprint information with respect to the user's fingerprint matches maintained fingerprint information with respect to authorized users' fingerprints.

For one example, the processor can determine, when the user attempts to become reauthorized using fingerprint information, situational information or spatial orientation with respect to the device. In response thereto, the processor can select the maintained fingerprint information with respect to the most likely finger, finger orientation, or both, and can decrypt that maintained fingerprint information while the user's fingerprint information is being retrieved. This can have the effect that the user need not wait while that maintained fingerprint information is being decrypted.

For one example, the processor can determine, when the user attempts to become reauthorized using fingerprint information, one or more most sets of likely fingerprint information (such as fingers, finger orientations, or both), in response to situational information or spatial orientation with respect to the device. In such cases, the processor can determine a first set of likely fingerprint information, a second set of likely fingerprint information, and similarly. This can have the effect that, even if the first set of likely fingerprint information is not accurate, the processor can optimize its sequence of selections so as to relatively rapidly select the correct maintained fingerprint information.

For one example, the processor can re-determine, from time to time, situational information or spatial orientation with respect to the device. In response thereto, the processor can select the maintained fingerprint information with respect to the most likely finger, finger orientation, or both, and can cache that most likely maintained fingerprint information so that it will be readily available when the user attempts to become reauthorized using fingerprint information. In alternative cases, the processor can await one or more trigger conditions to select the maintained fingerprint information with respect to the most likely finger, finger orientation, or both.

In one embodiment, the processor can determine, from time to time, situational information or spatial orientation such as whether the user is touching the device screen, in how many places the user is touching the device screen, and a size and orientation of the device screen. For a first example, if the user is touching the device screen with their right hand at a substantial distance from the function button, the processor can conclude that the finger being used with the function button is likely to be on their left hand. For a second example, if the user is touching the device screen with their right hand and their fingers are relatively close together, the processor can conclude that the finger being used with the function button is likely to be on their left hand.

In one embodiment, the processor can determine a "soft" function button, such as a software button responsive to capacitive touch on the device screen. In such cases, the processor can determine a set of likely fingerprint information in response to a position of the soft button and in response to other situational information or spatial orientation.

In one embodiment, the processor can use additional situational information. For a first example, the processor can use photographic or video information about the user, which can be gleaned by use of a camera in (or coupled to) the device. For a second example, the processor can use information gleaned from statistical information about a population of users, such as either (A1) a set of users associated with the type of device, (A2) a set of users associated with the particular device, (A3) the particular users associated with one or more login accounts then being used with the device. For a third example, the processor can use information such as (B1) whether headphones are coupled to the device, (B2) recent hand movements by the user more likely to be performed with the right hand or left hand, (B3) handwriting information about the user, such as the shape of arches of letters or whether the user is right-handed or left-handed. For a fourth example, the processor can use information such as (C1) accelerometer information relating to by which hand the user is likely to be holding the device, (C2) other sensors coupled to the device that indicate which other fingers are more likely to be touching the function button, and similarly.

In one embodiment, the processor maintains a fingerprint matching database in response to accelerometer data and in response to situational information. The accelerometer data and situational information allows the processor to determine a set of likely fingerprint information.

For a first example, the processor can detect that the user's finger is on the function button, determine using device software a display orientation (such as portrait or landscape), and if in landscape mode, determine using an accelerometer whether the function button is on the left or right of the device, and select those fingers on the left or right hand accordingly. For a second example, the processor maintains a lifetime average of which finger is most likely to be used, and in what configuration. For a third example, the processor maintains a set of time and place situational information, such as "in the morning when the alarm is set off", along with associated information with respect to which finger is most likely to be used, and in what configuration. For a fourth example, the processor determines whether the device is being used with a Bluetooth™ headset, and if so, uses associated information with respect to which finger is most likely to be used, and in what configuration. For a fifth example, when the device (such as an iPhone™) is both relatively level and stationary for a relatively long time duration, the processor can conclude that the device has been sitting unused on a desk or table, and can conclude that likely fingerprint information includes a pointing finger rather than some other finger. For a sixth example, when the device (such as an iPhone™) is being used at a slightly upward angle, such as with the user's hand approximately mid-torso with the display oriented toward the user's face, the processor can conclude that likely fingerprint information includes the user's thumb.

While several scenarios with respect to likely fingerprint information are described herein, in the context of the invention, there is no particular requirement for any of them to be particularly applicable, at any specific time and place, or otherwise. In one embodiment, likely fingerprint information is responsive to the particular patterns of usage by one or more users of the device, such as a primary user of the device and possibly alternative users of the device. Moreover, as described herein, while the device determines likely fingerprint information, in the event the likely fingerprint information does not match the received information, the device can determine alternative likely fingerprint information, or can check other maintained fingerprint information until achieving a definitive "match" or "no-match" result.

Although this application describes exemplary embodiments and variations thereof, still other embodiments of the present disclosure will become apparent to those skilled in the art from the following detailed description, which shows and describes illustrative embodiments of the disclosure. As will be realized, the disclosure is capable of modifications in various obvious aspects, all without departing from the spirit and scope of the present disclosure. The drawings and detailed description are intended to be illustrative in nature and not restrictive.

BRIEF DESCRIPTION OF THE DRAWINGS

FIG. 4 (collectively including FIG. 4A and FIG. 4B) shows a conceptual drawing of a touch I/O device including a fingerprint recognition system.

DETAILED DESCRIPTION

Terms and Phrases

The text "fingerprint or similar information", and variants thereof, generally refers to information that might be desirable to match in response to input from a user. While this application generally describes embodiments relating to fingerprint information, in the context of the invention, there is no particular requirement for any such limitation. For example, that information could include biometric information, such as facial recognition information, gesture recognition information, iris recognition information, muscular timing information (such as timing between keystrokes, mouse clicks, inputs, or otherwise), and other information.

The text "likely fingerprint information", and variants thereof, generally refers to one or more choices of fingers, finger orientations, or both, with respect to a user, deemed likely to be used by the user to attempt to become authorized or reauthorized using fingerprint information. For a first example, likely fingerprint information could include a choice of finger, a choice of finger orientation, or a combination or conjunction thereof. For a second example, likely fingerprint information could include a portion of a fingerprint image, an orientation thereof, or a combination or conjunction thereof.

For a third example, likely fingerprint information could include a first, second, third, and other fingers or finger orientations, or both, or other information about the user's finger or fingerprint with respect to matching maintained fingerprint information. In such cases, the device might choose likely fingerprint information that starts with a user's left thumb as the most likely finger (possibly including a most likely orientation), followed by a right thumb as a next most likely finger (again possibly including a most likely orientation), and similarly. It should be appreciated that this is but one example and other orders of likelihood with respect to finger, or other input elements, may be used. Further, in such cases, the device might choose a combination of finger and orientation as most likely, followed by only the choice of finger as most likely, followed by a combination of a different finger and orientation, and similarly.

The text "maintained fingerprint information", "maintained information", and variants thereof, generally refers to information maintained by a device that might later be used to compare with new information, retrieved from a user or otherwise. For a first example, maintained fingerprint information could include fingerprint information, or variants thereof such as fingerprint wavelet information or fingerprint ridgemap information. For a second example, maintained fingerprint information could include encrypted information, or variants thereof such as information that is obfuscated or maintained steganographically.

The text "retrieved fingerprint information", "retrieved information", and variants thereof, generally refers to information retrieved from a user or otherwise, such as to compare with information maintained by a device. For a first example, retrieved fingerprint information could include fingerprint information, or variants thereof such as a sequence of fingerprint information or a patchwork of fingerprint information.

Function Buttons

Figure 1:
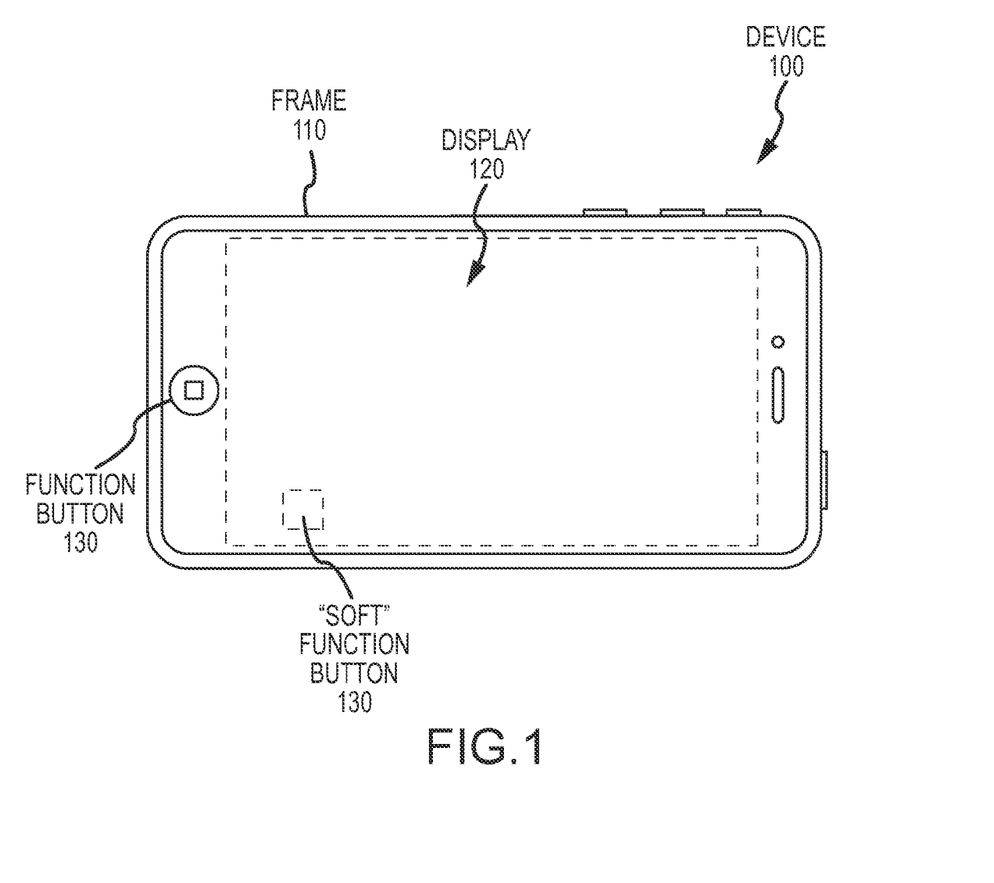
FIG. 1 shows a conceptual drawing of a device having one or more function buttons.

FIG. 1 shows a conceptual drawing of a device having one or more function buttons.

A device 100 can include a frame 110, a display 120, a function button 130, and (optionally) other hardware and software elements as described herein. For example, the device 100 can include an accelerometer (or other inertial response sensor), disposed to determine one or more movements or positions of the device 100, as described herein.

In one embodiment, the device 100 can take the form of an iPad™ or iPhone™, or similar device, or any other device having touch device capability, a function button, or other elements related to the nature of the technology described herein. (The function button is sometimes referred to herein as a "home" button.) Thus, for example, the device may be any form of smart or mobile telephone, tablet computing device, personal digital assistant, computing input device, touch pad for an appliance, vehicle, and the like (or such an item itself), medical device, wearable computing device, and so on. The device 100 can include a processor (not shown in this figure), program and data memory (not shown in this figure), and instructions (not shown in this figure) directing the processor to perform functions as described herein. The device 100 can also include data memory (not shown in this figure) including maintained fingerprint information, as described above, with respect to fingerprints or other biometric information suitable for identifying and authenticating one or more users of the device 100. For example, the data memory can include one or more images of fingerprints, one or more transformations of fingerprints suitable for matching, or other information with respect to fingerprints.

In one embodiment, the device 100 can include a frame 110, which can be disposed in a "portrait" mode, in which a width of the frame 110 is narrower than a length of the frame 110, or in a "landscape" mode, in which a width of the frame 110 is wider than a length of the frame 110. For example, the "portrait" mode can emulate a page of paper held lengthwise, while the "landscape" mode can emulate a page of paper held sideways. In one embodiment, the device 100 can include a display 120 disposed on the frame 110 and disposed to present an image similar to a page of paper, such as held either lengthwise or sideways, as described above.

In one embodiment, the device 100 can include a function button 130, which can be disposed at one end of the device 100, such as at a bottom or top of the frame 110 and display 120 when the frame 110 and display 120 are disposed in the "portrait" mode. Alternatively, the function button 130 can be disposed at a right or left of the frame 110 when the frame 110 and display 120 are disposed in the "landscape" mode. For example, as shown in the figure, the function button 130 can be disposed at a left of the frame 110.

In one embodiment, as described above, the device 100 can include an accelerometer, or other inertial responsive sensor. This can have the effect that the processor (or some other element disposed in the device 100) can determine whether the device 100 is positioned in the "portrait" mode or in the "landscape" mode. In either such mode, the processor (or some other element disposed in the device 100) can determine at which end of the device 100 (and similarly, at which end of the frame 110 and display 120) the function button 130 is positioned. Alternatively, the device 100 can include a processor and software elements that can determine whether the device 100 is disposed in the "portrait" mode or in the "landscape" mode, such as having been placed in one of those modes in response to the accelerometer, or in response to a application command or user command. In the event the device 100 determines whether it is in the "portrait" mode or in the "landscape" mode in response to a software element, the device 100 can use an accelerometer to determine whether the function button 130 is positioned at the top or bottom, or at the right or left.

In response to determining the position of the function button 130 relative to the frame 110 and the display 120, the device 100 can determine which finger the user is most likely to use when touching the function button 130.

For example, the user might touch the function button 130 so the device 100 can capture a fingerprint image, sometimes referred to herein as "retrieved fingerprint information" or "retrieved information". The device 100 can compare the retrieved fingerprint information with information with respect to fingerprints it maintained, sometimes referred to herein as "maintained fingerprint information" or "maintained information". When the retrieved fingerprint information matches the maintained fingerprint information, the device 100 can determine the identity of the user, and can determine if the user is authorized to perform functions with respect to operation of the device 100.

For example, if the device 100 does not have any maintained fingerprint information with respect to the user's fingerprints, the device 100 would generally not identify the user as being authorized to perform any functions with respect to operation of the device 100. However, if the device 100 does have maintained fingerprint information with respect to the user's fingerprints, the device 100 could have associated with that maintained fingerprint information one or more sets of authorization information, with the effect that the user could then use the device 100 for those operations.

In one embodiment, the device 100 determines likely fingerprint information, such as the user's most likely finger, most likely finger orientation, or combination or conjunction thereof, the user might attempt with respect to the function button 130 in any particular situation. For a first example, as described herein, when the function button 130 is on the left of the device 100, the device 100 could determine that the user is most likely to use a left-hand finger with the function button 130. For a second example, as described herein, when the device 100 is tilted so as to be oriented toward the user, the device 100 could determine that the user is most likely to use a pointer finger with the function button 130. As described herein, the device 100 can determine one or more possible sets of likely fingerprint information, and can apply those sets of likely fingerprint information to attempt to optimize matching retrieved fingerprint information with maintained fingerprint information.

In one embodiment, the device 100 can include, in addition to or instead of a "hard" (such as physical) function button 130, a "soft" (such as software) function button 130, which can be presented on the display 120 in the user's view and with the user capable of touching the "soft" function button 130 on the display 120. For example, the device 100 can include a "soft" function button 130 in response to instructions maintained in the program and data memory, and interpreted by the processor, with the effect that the user can see the "soft" function button 130 and can touch the "soft" function button 130 to direct the device 100 to perform one or more functions.

For example, the "soft" function button 130 can include a capacitive touch sensor, as described herein, by which the device 100 can determine that the user has touched the function button 130. In addition, the "soft" function button 130 can include a fingerprint sensor element, as described herein, by which the device 100 can determine retrieved fingerprint information with respect to the user. When the device 100 determines retrieved fingerprint information with respect to the user, the device 100 can attempt to match that retrieved fingerprint information with its maintained fingerprint information, to identify and authorize the user to perform functions with respect to the device 100.

In one embodiment, the device 100 can maintain one or more "soft" function buttons 130. These "soft" function buttons 130 can be positioned at one or more locations on the display 120, such as including locations that might be otherwise used for application function buttons, keypad buttons, or other types of buttons or controls.

As described herein, the device 100 can determine likely fingerprint information that applies to "soft" function buttons 130 in addition to, or instead of, "hard" function buttons 130. In either such case, the device 100, in response to situational information (such as spatial orientation or other information), predicts likely fingerprint information. In response to the likely fingerprint information, the device 100 selects one or more sets of maintained fingerprint information to match against the retrieved fingerprint information. However, the device 100 can distinguish between the likely fingerprint information it predicts for "soft" function buttons 130 versus the likely fingerprint information it predicts for "hard" function buttons 130.

Similarly, the device 100 can determine, in addition to or instead of a choice of which finger or fingers of a user is likely to provide or correspond to fingerprint information, a choice of what orientation of the user's finger is likely fingerprint information. For a first example, if the device 100 is disposed in "landscape" mode and the function button 130 is located on the left, the device 100 can determine that the user's left thumb (if the most likely finger) would be most likely oriented up-down. In contrast, if the device 100 and the function button 130 are similarly disposed, the device 100 can determine that the user's left pointing finger (if the most likely finger) would be most likely orientated right-left.

In one embodiment, the processor in the device 100 can determine a recent movement of the device (such as in response to an accelerometer or other inertial response sensor), and can conclude which of several known hand or finger movements by the user are most likely. In such examples, if the device is rotated so that the function button is moved to the left, the processor can conclude that the user is most likely to touch the function button with a left-hand finger, as it is more unwieldy to reach across the screen to touch the function button with a right-hand finger.

Finger Position and Situational Information

Figure 2:
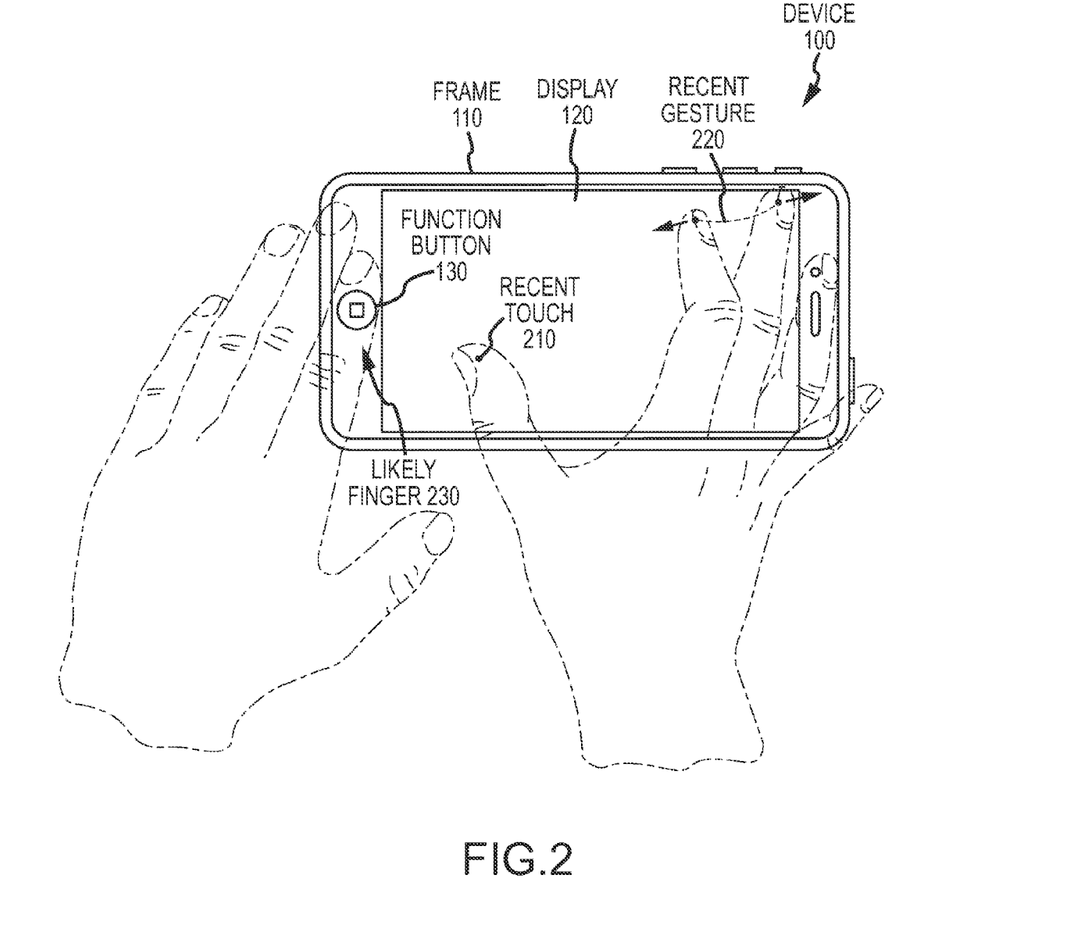
FIG. 2 shows a conceptual drawing of a user's finger position with respect to other situational information.

FIG. 2 shows a conceptual drawing of a user's finger position with respect to other situational information.

In one embodiment, the processor can determine, from time to time, situational information or spatial orientation such as whether the user is touching the device screen, in how many places the user is touching the device screen, and a size and orientation of the device screen.

For example, if the user has touched the display 120 at a location of a recent touch 210, or at a location of a recent gesture 220 (the latter involving two fingers), the processor can conclude that the finger being used with the function button is likely to be on their left hand. In such examples, the function button 130 would be proximate to a likely finger 230. Similarly, if the user is touching the device screen with their right hand and their fingers are relatively close together, as shown in the figure, the processor can conclude that the finger being used with the function button is likely to be on their left hand, also as shown in the figure.

For example, the processor can determine that, should the same finger, or finger orientation, or both, be used 90% of the time or more in the same situation, then that same finger, or finger orientation, or both, is relatively most likely to be used again. Similarly, the processor can request information from the user with respect to whether the particular situation should be regarded as "special", in the sense that the particular situation should be used to determine likely fingerprint information. Moreover, the processor can use a machine learning technique to determine whether the particular situation should be regarded as "special", in the same or a similar sense.

For example, the processor can determine, if the time of day is the same or similar for a particular situation, time or location, that the user is most likely to use the same finger, finger orientation, or both, with respect to the device as was used during the last same or similar situation, time, and/or location, or as was used during an aggregate model created from such data. For a first example, if the device has been relatively immobile and powered-off (or in standby mode) for several hours overnight, the processor can conclude that the user has placed the device on a night-table or similar location, and that the user is most likely to use the same finger as usual to activate the device upon wake-up. For a second example, if the device has been relatively immobile for more than several minutes, but during the day, the processor can conclude that the user has placed the device on a table for later use, and that the user is most likely to use the same finger as usual to activate the device when needed. For a third example, if the device has been relatively immobile, but at a location other than the user's home or office, the processor can conclude that the user has mistakenly left the device in an unusual location, and can conclude that the user might use a different finger than usual to activate the device when finally located. For a fourth example, if the device cannot authenticate the user using a first set of likely fingerprint information, the processor can conclude that the user is most likely to use an orientation 90° away from that first set of likely fingerprint information.

Method of Operation

Figure 3:
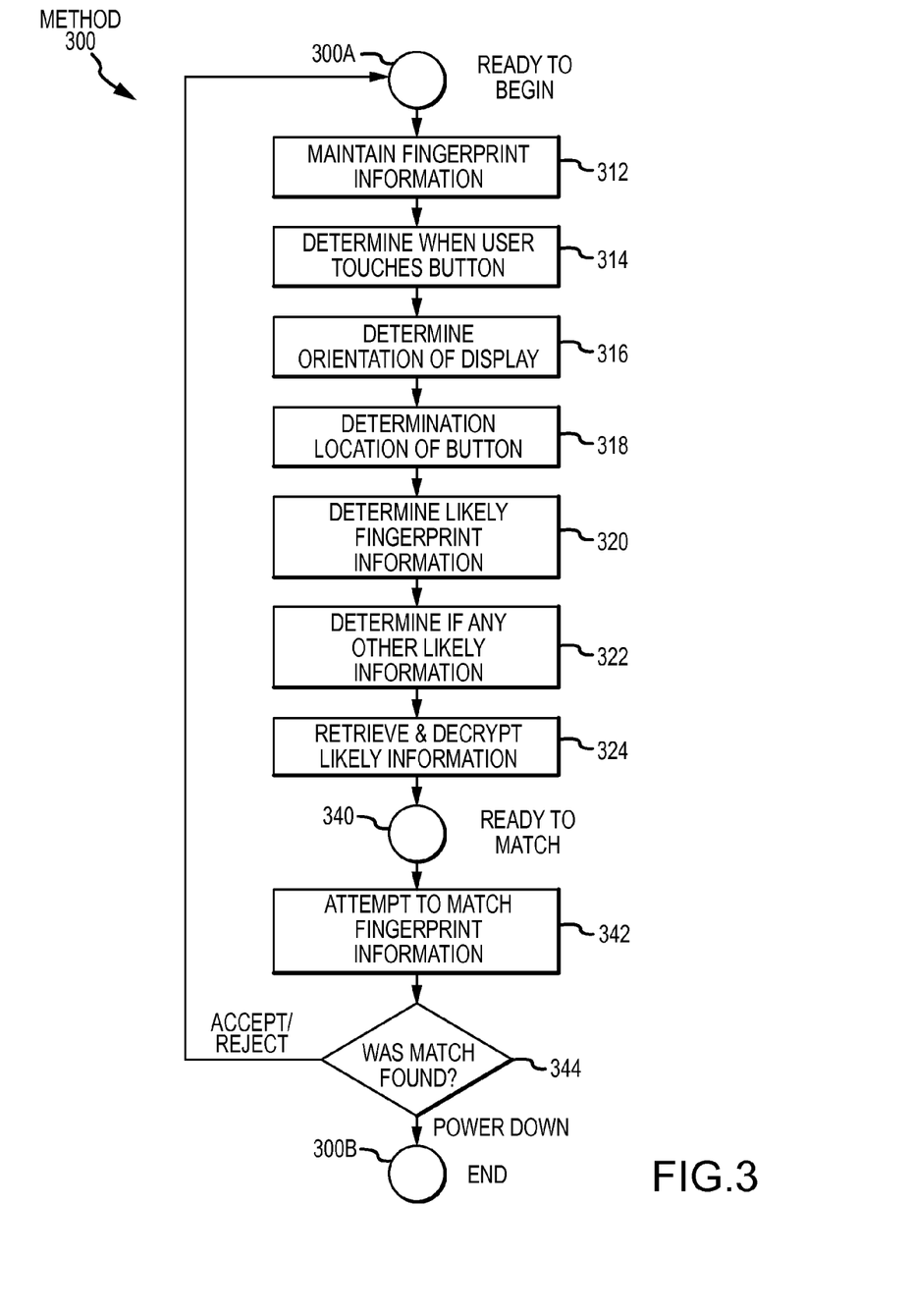
FIG. 3 shows a conceptual drawing of method of operation.

FIG. 3 shows a conceptual drawing of method of operation.

A method 300 includes a set of flow points and method steps.

Although these flow points and method steps are shown performed in a particular order, in the context of the invention, there is no particular requirement for any such limitation. For example, the flow points and method steps could be performed in a different order, concurrently, in parallel, or otherwise.

Although these flow points and method steps are sometimes described as being performed by the method 300, in one embodiment, they can be performed by a processor in the device 100. Although these flow points and method steps are shown performed by a general purpose processor in the device 100, in the context of the invention, there is no particular requirement for any such limitation. For example, one or more such method steps could be performed by special purpose processor, by another circuit, or be offloaded to other processors or other circuits in other devices, such as by offloading those functions to nearby devices using wireless technology or by offloading those functions to cloud computing functions.

At a flow point 300A, the method 300 is ready to begin.

At a step 312, the method 300 maintains a set of maintained fingerprint information in data memory in the device 100. In one embodiment, the maintained fingerprint information can be maintained in the data memory in the device 100 using a technique that permits relatively rapid selection and access in response to situational information, such as spatial orientation of the device 100. For example, the maintained fingerprint information can be maintained in the data memory in the device 100 in response to accelerometer information, or in response to a cluster of situational information (such as location and time information).

At a step 314, the method 300 determines when the user places their finger on the function button 130. In one embodiment, this step can be performed for either a "soft" function button 130 or for a "hard" function button 130, as described above.

At a step 316, the method 300 determines an orientation of the display 120. For example, a processor in the device 100 can determine if the display 120 is set to present information to the user in "portrait" mode or in "landscape" mode. If the display 120 is oriented in "landscape" mode, the method 300 proceeds with the next step. If the display 120 is oriented in "portrait" mode, the method 300 proceeds with the flow point 340.

At a step 318, the method 300 determines, in response to an accelerometer (or other inertial response sensor), whether the function button 130 is on the left or the right of the display 120.

At a step 320, the method 300 determines, in response to whether the function button 130 is on the left or the right of the display 120, a set of likely fingerprint information. For example, if the function button 130 is on the left of the display 120, the method 300 can select left-hand fingers as the likely fingerprint information.

Although this application generally describes a method 300 which selects a set of likely fingerprint information indicates a most likely user's finger, or finger orientation, or combination or conjunction thereof, in the context of the invention, there is no particular requirement for only one such set of likely fingerprint information. For example, the method 300 can select a first, a second, a third, and so on, sets of likely fingerprint information, such as a most likely set, a second most likely set, a third most likely set, and so on. This can have the effect that, even if the first set of likely fingerprint information is not accurate, the processor can optimize its sequence of selections so as to relatively rapidly select the correct maintained information.

At a step 322, the method 300 determines, in response to other situational information that might be available, whether there is any other likely fingerprint information. As part of this step, the method 300 can determine one or more of the following elements of situational information:

(A) The method 300 can determine a lifetime average of which user's finger, or finger orientation, or combination or conjunction thereof, is most likely to be used with the function button 130.

(B) The method 300 can determine, in response to a location and time scenario, which user's finger, or finger orientation, or combination or conjunction thereof, is most likely to be used with the function button 130. In the examples below, "substantially each" generally refers to a relatively large fraction of time, such as 90% of cases. "Substantially each" may refer to a most likely occurrence, in some embodiments. That is, if a user employs a first finger for an operation 40% of the time, a second finger for the same operation 35% of the time and a thumb for the operation 25% of the time, certain embodiments may determine or presume that the first finger is used substantially each time.

For a first example, if substantially each morning when the device 100 alarm is set, the user touches the function button 130 with their right hand, the method 300 selects the user's fingers on their right hand as likely fingerprint information.

For a second example, if substantially each time the user is wearing a Bluetooth™ headset, the user touches the function button 130 with their right hand, the method 300 selects the user's fingers on their right hand as likely fingerprint information.

For a third example, if substantially each time the device 100 is level or otherwise stationary for a relatively long period of time (such as, more than an hour), the user uses their thumb, particularly their right thumb, with the function button 130, the method 300 selects that finger as likely fingerprint information. In such examples, if the device is inactive for several night-time hours, it might occur that the user has been asleep for that time duration, in which case the processor can conclude that the user will touch the function button to turn the device on. If the user has a habit of using their thumb to turn the device on after a sleep cycle, the processor can conclude that the same thumb is most likely to be used in that situation.

For a fourth example, if substantially each time the device 100 is at an angle and oriented toward the user's face, the user uses their pointing finger, particularly their right-hand pointing finger, with the function button 130, the method 300 selects that finger as likely fingerprint information. In such examples, indicated situations can be identified by the processor with respect to input from the accelerometer, with respect to a GPS or Wi-Fi monitor, with respect to input from a clock or timer, or otherwise to indicate a particular time, place, or manner in which the device is being used. In such examples, if the user uses their pointing finger, particularly their right-hand pointing finger, to select the function button 130, when using the device 100, the processor can determine a relatively high likelihood that the user will use the same finger, or finger orientation, in that particular situation.

(C) The method 300 can determine, in response to additional situational information, one or more sets of likely fingerprint information, or modifications of the likely fingerprint information.

For a first example, the processor can use photographic or video information about the user, which can be gleaned by use of a camera in (or coupled to) the device.

For a second example, the processor can use information gleaned from statistical information about a population of users, such as either (A) a set of users associated with the type of device, (B) a set of users associated with the particular device, (C) the particular users associated with one or more login accounts then being used with the device.

For a third example, the processor can use information such as (A) whether headphones are coupled to the device, (B) recent hand movements by the user more likely to be performed with the right hand or left hand, (C) handwriting information about the user, such as the shape of arches of letters or whether the user is right-handed or left-handed.

For a fourth example, the processor can use information such as (A) accelerometer information relating to by which hand the user is likely to be holding the device, (B) other sensors coupled to the device that indicate which other fingers are more likely to be touching the function button, and similarly.

In alternative embodiments, the method 300 can, from time to time, such as periodically or aperiodically, randomly or pseudorandomly, or in response to a trigger, re-determine whether it can select any likely fingerprint information in response to situational information or spatial orientation. If not, the method 300 proceeds with the flow point 340 as if that flow point was reached because the device was in "portrait" mode. If so, the method 300 attempts to select such likely fingerprint information, and proceeds with the flow point 340 as if that flow point was reached because the device was in "landscape" mode.

At a step 324, the method 300 can select the maintained fingerprint information associated with the likely fingerprint information, retrieve that maintained fingerprint information from the data memory, and decrypt that maintained fingerprint information while retrieving the retrieved fingerprint information. This can have the effect that the user need not wait for the method 300 to decrypt the maintained fingerprint information after retrieving the retrieved fingerprint information, and can instead proceed without substantial delay.

With respect to the most likely finger, finger orientation, or both, and can decrypt that maintained information while the user's fingerprint information is being retrieved. This can have the effect that the user need not wait while that maintained information is being decrypted.

At a flow point 340, the method 300 is ready to attempt to match retrieved fingerprint information with maintained fingerprint information. If the flow point 340 was reached because the device was in the "portrait" mode, there is no selected likely fingerprint information. If the flow point 340 was reached because the device was in the "landscape" mode, there should be selected likely fingerprint information, and the method 300 can begin with that likely fingerprint information.

At a step 342, the method 300 attempts to match the retrieved fingerprint information with the maintained fingerprint information, starting with the likely fingerprint information (if any), and continuing with other maintained fingerprint information if the likely fingerprint information (if any) does not match.

At a step 344, the method 300 determines if it was able to find a match between the retrieved fingerprint information and the maintained fingerprint information. If not, the method 300 rejects the user, and returns to the flow point 300A. If so, the method 300 accepts the user, performs the function desired by the user (such as authorizing the user for later functions), and returns to the flow point 300A.

At a flow point 300B, the method 300 is over. In one embodiment, the method 300 repeats so long as the device is powered on.

Touch I/O Device Including Fingerprint Recognition System

Figure 4A:
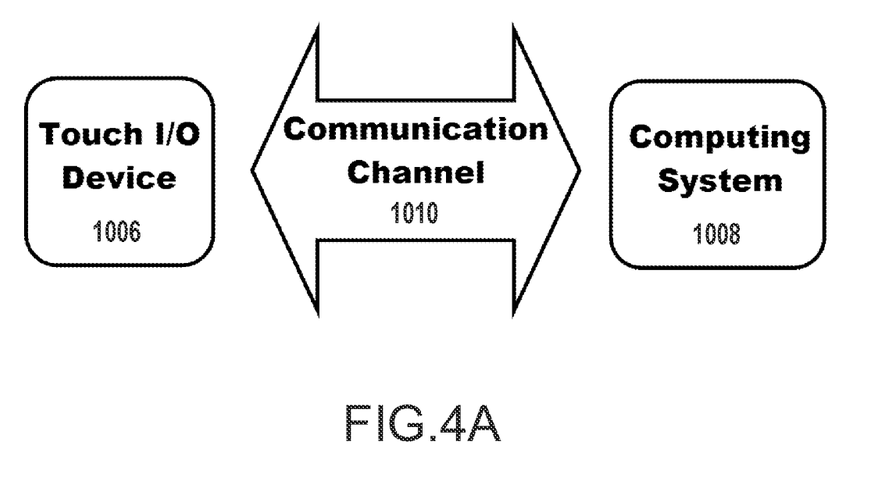
Figure 4B:
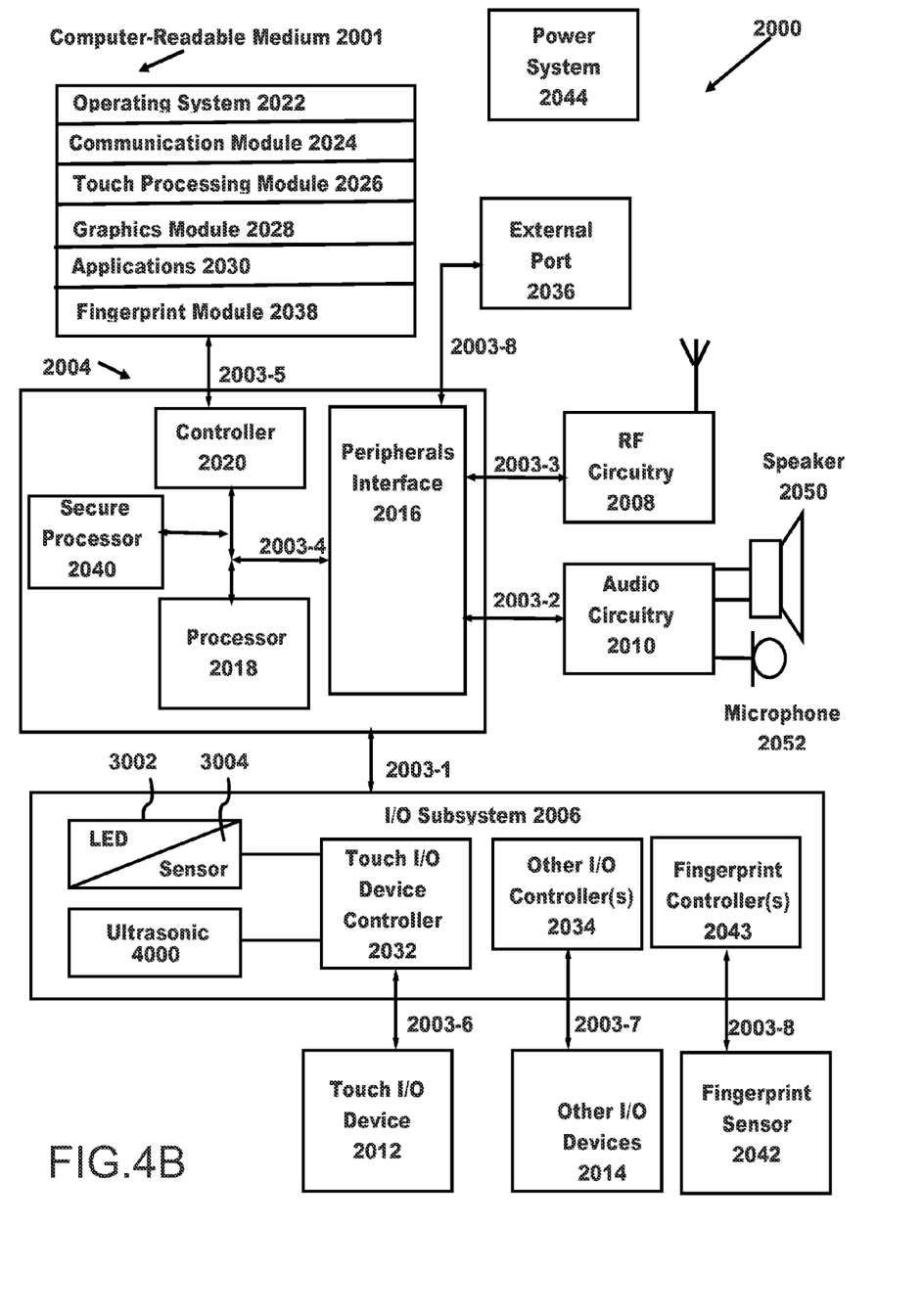

FIG. 4 (collectively including FIG. 4A and FIG. 4B) shows a conceptual drawing of a touch I/O device including a fingerprint recognition system.

Described embodiments may include touch I/O device 1001 that can receive touch input for interacting with computing system 1003 via wired or wireless communication channel 1002. Touch I/O device 1001 may be used to provide user input to computing system 1003 in lieu of or in combination with other input devices such as a keyboard, mouse, etc. One or more touch I/O devices 1001 may be used for providing user input to computing system 1003. Touch I/O device 1001 may be an integral part of computing system 1003 (e.g., touch screen on a laptop) or may be separate from computing system 1003.

For example, touch I/O device 1001 can interact with a user with the user touching the touch I/O device 1001 with the user's finger (or otherwise bringing the user's finger near to the touch I/O device 1001), with the effect that the touch I/O device 1001 can receive fingerprint image data, and optionally provide feedback to the user that the fingerprint image data was received.

Touch I/O device 1001 may include a touch sensitive panel which is wholly or partially transparent, semitransparent, non-transparent, opaque or any combination thereof. Touch I/O device 1001 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard) or any multi-dimensional object having a touch sensitive surface for receiving touch input.

In one example, touch I/O device 1001 embodied as a touch screen may include a transparent and/or semitransparent touch sensitive panel partially or wholly positioned over at least a portion of a display. According to this embodiment, touch I/O device 1001 functions to display graphical data transmitted from computing system 1003 (and/or another source) and also functions to receive user input. In other embodiments, touch I/O device 1001 may be embodied as an integrated touch screen where touch sensitive components/devices are integral with display components/devices. In still other embodiments a touch screen may be used as a supplemental or additional display screen for displaying supplemental or the same graphical data as a primary display and to receive touch input.

Touch I/O device 1001 may be configured to detect the location of one or more touches or near touches on device 1001 based on capacitive, resistive, optical, acoustic, inductive, mechanical, chemical measurements, or any phenomena that can be measured with respect to the occurrences of the one or more touches or near touches in proximity to deice 1001. Software, hardware, firmware or any combination thereof may be used to process the measurements of the detected touches to identify and track one or more gestures or fingerprints. A gesture or fingerprint may correspond to stationary or non-stationary, single or multiple, touches or near touches on touch I/O device 1001. A gesture or fingerprint may be performed by moving one or more fingers or other objects in a particular manner on touch I/O device 1001 such as tapping, pressing, rocking, scrubbing, twisting, changing orientation, pressing with varying pressure and the like at essentially the same time, contiguously, or consecutively. A gesture or fingerprint may be characterized by, but is not limited to a pinching, sliding, swiping, rotating, flexing, dragging, or tapping motion between or with any other finger or fingers. A single gesture may be performed with one or more hands, by one or more users, or any combination thereof.

Computing system 1003 may drive a display with graphical data to display a graphical user interface (GUI). The GUI may be configured to receive touch input via touch I/O device 1001. Embodied as a touch screen, touch I/O device 1001 may display the GUI. Alternatively, the GUI may be displayed on a display separate from touch I/O device 1001. The GUI may include graphical elements displayed at particular locations within the interface. Graphical elements may include but are not limited to a variety of displayed virtual input devices including virtual scroll wheels, a virtual keyboard, virtual knobs, virtual buttons, any virtual UI, and the like. A user may perform gestures at one or more particular locations on touch I/O device 1001 which may be associated with the graphical elements of the GUI. In other embodiments, the user may perform gestures at one or more locations that are independent of the locations of graphical elements of the GUI. Gestures performed on touch I/O device 1001 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 1003 (e.g., affect a state or mode of a GUI, application, or operating system). Gestures may or may not be performed on touch I/O device 1001 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other embodiments in which gestures are performed directly on a touch screen, a user may interact directly with objects on the touch screen, with or without a cursor or pointer being displayed on the touch screen.

Feedback may be provided to the user via communication channel 1002 in response to or based on the touch or near touches on touch I/O device 1001. Feedback may be transmitted optically, mechanically, electrically, olfactory, acoustically, or the like or any combination thereof and in a variable or non-variable manner. For example, feedback can include interaction with a user indicating (A) that one or more sets of fingerprint image information have been received, (B) that one or more sets of fingerprint image information have been enrolled in a database, (C) that one or more sets of fingerprint image information have been confirmed as associated with the user, or otherwise.

Attention is now directed towards embodiments of a system architecture that may be embodied within any portable or non-portable device including but not limited to a communication device (e.g. mobile phone, smart phone), a multimedia device (e.g., MP3 player, TV, radio), a portable or handheld computer (e.g., tablet, netbook, laptop), a desktop computer, an All-In-One desktop, a peripheral device, or any other system or device adaptable to the inclusion of system architecture 2000, including combinations of two or more of these types of devices. A block diagram of one embodiment of system 2000 generally includes one or more computer-readable mediums 2001, processing system 2004, Input/Output (I/O) subsystem 2006, radio frequency (RF) circuitry 2008 and audio circuitry 2010. These components may be coupled by one or more communication buses or signal lines 2003. Each such bus or signal line may be denoted in the form 2003-X, where X is a unique number. The bus or signal line may carry data of the appropriate type between components; each bus or signal line may differ from other buses/lines, but may perform generally similar operations.

It should be apparent that the architecture shown in the figure is only one example architecture of system 2000, and that system 2000 could have more or fewer components than shown, or a different configuration of components. The various components shown in the figure can be implemented in hardware, software, firmware or any combination thereof, including one or more signal processing and/or application specific integrated circuits.

RF circuitry 2008 is used to send and receive information over a wireless link or network to one or more other devices and includes well-known circuitry for performing this function. RF circuitry 2008 and audio circuitry 2010 are coupled to processing system 2004 via peripherals interface 2016. Interface 2016 includes various known components for establishing and maintaining communication between peripherals and processing system 2004. Audio circuitry 2010 is coupled to audio speaker 2050 and microphone 2052 and includes known circuitry for processing voice signals received from interface 2016 to enable a user to communicate in real-time with other users. In some embodiments, audio circuitry 2010 includes a headphone jack (not shown).

Peripherals interface 2016 couples the input and output peripherals of the system to processor 2018 and computer-readable medium 2001. One or more processors 2018 communicate with one or more computer-readable mediums 2001 via controller 2020. Computer-readable medium 2001 can be any device or medium that can store code and/or data for use by one or more processors 2018. Medium 2001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 2001 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 2018 run various software components stored in medium 2001 to perform various functions for system 2000. In some embodiments, the software components include operating system 2022, communication module (or set of instructions) 2024, touch processing module (or set of instructions) 2026, graphics module (or set of instructions) 2028, one or more applications (or set of instructions) 2030, and fingerprint sensing module (or set of instructions) 2038. Each of these modules and above noted applications correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, medium 2001 may store a subset of the modules and data structures identified above. Furthermore, medium 2001 may store additional modules and data structures not described above.

Operating system 2022 includes various procedures, sets of instructions, software components and/or drivers for controlling and managing general system tasks (e.g., memory management, storage device control, power management, etc.) and facilitates communication between various hardware and software components.

Communication module 2024 facilitates communication with other devices over one or more external ports 2036 or via RF circuitry 2008 and includes various software components for handling data received from RF circuitry 2008 and/or external port 2036.

Graphics module 2028 includes various known software components for rendering, animating and displaying graphical objects on a display surface. In embodiments in which touch I/O device 2012 is a touch sensitive display (e.g., touch screen), graphics module 2028 includes components for rendering, displaying, and animating objects on the touch sensitive display.

One or more applications 2030 can include any applications installed on system 2000, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc.

Touch processing module 2026 includes various software components for performing various tasks associated with touch I/O device 2012 including but not limited to receiving and processing touch input received from I/O device 2012 via touch I/O device controller 2032.

System 2000 may further include fingerprint sensing module 2038 for performing the method/functions as described herein in connection with figures as shown herein. Fingerprint sensing module 2038 may at least function to perform various tasks associated with the fingerprint sensor, such as receiving and processing fingerprint sensor input. The fingerprint sensing module 2038 may also control certain operational aspects of the fingerprint sensor 2042, such as its capture of fingerprint data and/or transmission of the same to the processor 2018 and/or secure processor 2040. Module 2038 may also interact with the touch I/O device 2012, graphics module 2028 or other graphical display. Module 2038 may be embodied as hardware, software, firmware, or any combination thereof. Although module 2038 is shown to reside within medium 2001, all or portions of module 2038 may be embodied within other components within system 2000 or may be wholly embodied as a separate component within system 2000.

I/O subsystem 2006 is coupled to touch I/O device 2012 and one or more other I/O devices 2014 for controlling or performing various functions. Touch I/O device 2012 communicates with processing system 2004 via touch I/O device controller 2032, which includes various components for processing user touch input (e.g., scanning hardware). One or more other input controllers 2034 receives/sends electrical signals from/to other I/O devices 2014. Other I/O devices 2014 may include physical buttons, dials, slider switches, sticks, keyboards, touch pads, additional display screens, or any combination thereof.

If embodied as a touch screen, touch I/O device 2012 displays visual output to the user in a GUI. The visual output may include text, graphics, video, and any combination thereof. Some or all of the visual output may correspond to user-interface objects. Touch I/O device 2012 forms a touch-sensitive surface that accepts touch input from the user. Touch I/O device 2012 and touch screen controller 2032 (along with any associated modules and/or sets of instructions in medium 2001) detects and tracks touches or near touches (and any movement or release of the touch) on touch I/O device 2012 and converts the detected touch input into interaction with graphical objects, such as one or more user-interface objects. In the case in which device 2012 is embodied as a touch screen, the user can directly interact with graphical objects that are displayed on the touch screen. Alternatively, in the case in which device 2012 is embodied as a touch device other than a touch screen (e.g., a touch pad), the user may indirectly interact with graphical objects that are displayed on a separate display screen embodied as I/O device 2014.

Touch I/O device 2012 may be analogous to the multi-touch sensitive surface described in the following U.S. patents: U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference.

Embodiments in which touch I/O device 2012 is a touch screen, the touch screen may use LCD (liquid crystal display) technology, LPD (light emitting polymer display) technology, OLED (organic LED), or OEL (organic electro luminescence), although other display technologies may be used in other embodiments.

Feedback may be provided by touch I/O device 2012 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 2000 also includes power system 2044 for powering the various hardware components and may include a power management system, one or more power sources, a recharging system, a power failure detection circuit, a power converter or inverter, a power status indicator and any other components typically associated with the generation, management and distribution of power in portable devices.

In some embodiments, peripherals interface 2016, one or more processors 2018, and memory controller 2020 may be implemented on a single chip, such as processing system 2004. In some other embodiments, they may be implemented on separate chips.

In addition to the foregoing, the system 2000 may include a secure processor 2040 in communication with a fingerprint sensor 2042, via a fingerprint I/O controller 2044. The operation of these various elements will now be described.

The fingerprint sensor 2042 may operate to capacitively capture a series of images, or nodes. When taken together, these nodes may form a set of fingerprint image information. A collection of nodes may be referred to herein as a "mesh", "mosaic", "template", or other indicator of fingerprint information.

Each node of fingerprint information may be separately captured by the fingerprint sensor 2042, which may be an array sensor. Generally, there is some overlap between images in nodes representing adjacent portions of a fingerprint. Such overlap may assist in assembling the fingerprint from the nodes, as various image recognition techniques may be employed to use the overlap to properly identify and/or align adjacent nodes in the fingerprint information.

Sensed fingerprint data may be transmitted through the fingerprint I/O controller 2044 to the processor 2018 and/or the secure processor 2040. In some embodiments, the data is relayed from the fingerprint I/O controller 2044 to the secure processor 2040 directly. Generally, the fingerprint data is encrypted by any of the fingerprint sensor 2042, the fingerprint I/O controller 2044 or another element prior to being transmitted to either processor. The secure processor 2040 may decrypt the data to reconstruct the node.

Fingerprint data, either as individual nodes, collections of nodes, or substantially complete fingerprint templates, may be stored in the computer-readable medium 2001 and accessed as necessary. In some embodiments, only the secure processor 2040 may access stored fingerprint data, while in other embodiments either the secure processor or the processor 2018 may access such data.

I claim:

1. A method of matching fingerprint information, the method comprising:
    detecting an attempt to match fingerprint information captured by a fingerprint matching device included in an electronic device;
    in response to an inertial response device output, detecting, for said fingerprint matching device, at least one of:
    an orientation of said fingerprint matching device, or
    a location of said fingerprint matching device in said electronic device;
    in response to said detected orientation or location of said fingerprint matching device, determining a most likely set of maintained fingerprint information for matching; and
    in response to a match of said captured fingerprint information to maintained fingerprint information included in said most likely set of maintained fingerprint information, performing a function.

2. The method as in claim 1, including in response to said detected orientation or location, determining whether said device is operating in a portrait mode or in a landscape mode.

3. The method as in claim 2, including in response to determining whether said device is operating in a portrait mode or in a landscape mode, determining a location of a function button.

4. The method as in claim 1, wherein said most likely set of maintained fingerprint information includes one or more of: a particular finger; a particular orientation of a finger; or a combination or conjunction thereof.

5. The method as in claim 1, wherein detecting an attempt to match fingerprint information includes detecting a contact between a user and a function button.

6. The method as in claim 5, wherein said function button includes one or more of:

a physical button positioned as part of the fingerprint matching device; or a soft button positioned using hardware or software elements on or under a surface of the electronic device.

7. A method of matching fingerprint information, the method comprising:
   detecting an attempt to match fingerprint information captured by a fingerprint matching device included in an electronic device;
   in response to an inertial response device output, detecting, for said electronic device, a recent movement of said electronic device;
   in response to said detected recent movement, determining, for said fingerprint matching device, a location of said fingerprint matching device based on said detected movement of said electronic device;
   in response to said detected location, determining a most likely set of maintained fingerprint information for matching; and
   in response to a match of said captured fingerprint information to maintained fingerprint information included in said most likely set of maintained fingerprint information, performing a function.

8. The method as in claim 7, wherein said inertial response device includes an accelerometer.

9. The method as in claim 7, wherein detecting a recent movement of said electronic device includes determining an amount of time during which the electronic device has been inactive.

10. A method of matching fingerprint information, the method comprising:
    detecting, by a processor, a recognizable situation with respect to a fingerprint matching device, said fingerprint matching device including a function button presented on a display, said function button including a fingerprint sensor element;
    in response to said detected recognizable situation, determining a most likely set of maintained fingerprint information for matching; and
    in response to a match of said captured fingerprint information to maintained fingerprint information included in said most likely set of maintained fingerprint information, said processor performing a function.

11. The method of matching fingerprint information as in claim 10, wherein said recognizable situation includes a lifetime average of at least one of:
    a choice of finger, or
    a choice of finger orientation, is used by a user to touch a function button.

12. The method of matching fingerprint information as in claim 11, wherein detecting said recognizable situation is responsive to a machine learning technique.

13. The method of matching fingerprint information as in claim 10, wherein detecting said recognizable situation is responsive to an input from said user.

14. The method of matching fingerprint information as in claim 10, wherein detecting said recognizable situation is responsive to:
    an output of a touch sensitive surface indicating a number of locations in which the user is touching the touch sensitive surface.

15. The method of matching fingerprint information as in claim 11, wherein detecting said recognizable situation includes determining whether a same of at least one of said choice of finger, or choice of finger orientation, is used by said user in at least a selected fraction of events.

16. An apparatus including
    a fingerprint matching device coupled to a processor;
    an inertial response device coupled to said fingerprint matching device and said processor, said processor configured to determine an orientation of said fingerprint matching device and a location of said fingerprint matching device based on an output received from said inertial response device; and
    wherein said processor has access to instructions directing said processor to determine a most likely set of maintained fingerprint information for matching in response to said detected orientation and location of said fingerprint matching device; and
    said processor has access to instructions directing said processor to attempt to match said most likely set of maintained fingerprint information to fingerprint information captured by said fingerprint matching device.

17. The apparatus as in claim 16, wherein said processor has access to instructions directing said processor to determine, in response to said detected orientation or location of said fingerprint matching device, whether said fingerprint matching device is operating in a portrait mode or in a landscape mode.

18. The apparatus as in claim 17, wherein said processor has access to instructions directing said processor to determine, in response to said determination of whether said fingerprint matching device is operating in a portrait mode or in a landscape mode, a location of a function button.

19. The apparatus as in claim 16, wherein said most likely set of maintained fingerprint information includes one or more of:
    a particular finger;
    a particular orientation of a finger; or
    a combination or conjunction thereof.

20. The apparatus as in claim 16, wherein detecting an attempt to match fingerprint information includes detecting a contact between a user and a function button.

21. The apparatus as in claim 20, wherein said function button includes one or more of:
    a physical button positioned as part of the fingerprint matching device; or
    a soft button positioned using hardware or software elements on or under a surface of the apparatus.

22. The method of matching fingerprint information as in claim 10, wherein detecting said recognizable situation is responsive to at least one of:
    an inertial response sensor output; or
    a position of said fingerprint matching device.

23. The method of matching fingerprint information as in claim 10, wherein detecting said recognizable situation is responsive to an image sensor output.

24. The method of matching fingerprint information as in claim 10, wherein detecting said recognizable situation is responsive to a time sensor output.

25. The method of matching fingerprint information as in claim 10, wherein detecting said recognizable situation is responsive to an indicator of a particular time, place, or manner in which the fingerprint matching device is being used.

* * * * *